July 15, 1941.   R. W. BAILY   2,249,264
OSCILLATOR
Filed Feb. 20, 1939   3 Sheets-Sheet 1

Inventor:
Robert W. Baily
by Bair & Freeman
Attorneys

July 15, 1941.  R. W. BAILY  2,249,264
OSCILLATOR
Filed Feb. 20, 1939   3 Sheets-Sheet 2
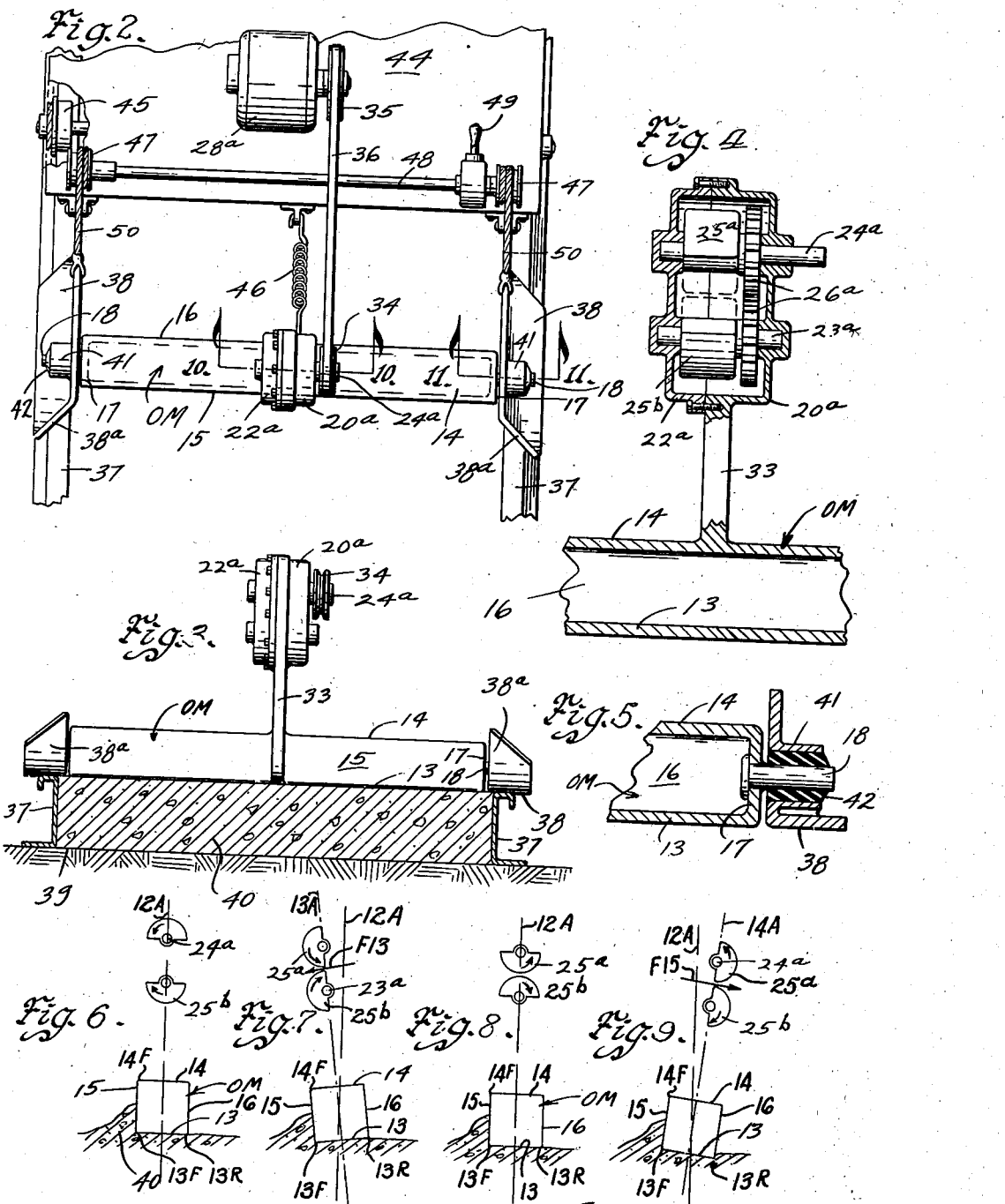
Inventor
Robert W. Baily
by Bair & Freeman, Att'ys July 15, 1941.    R. W. BAILY    2,249,264
OSCILLATOR
Filed Feb. 20, 1939    3 Sheets-Sheet 3
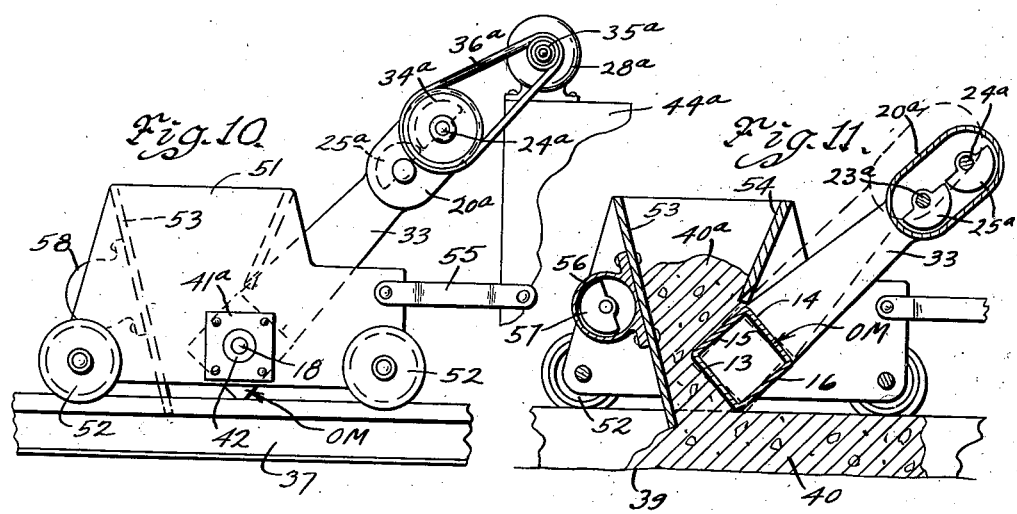
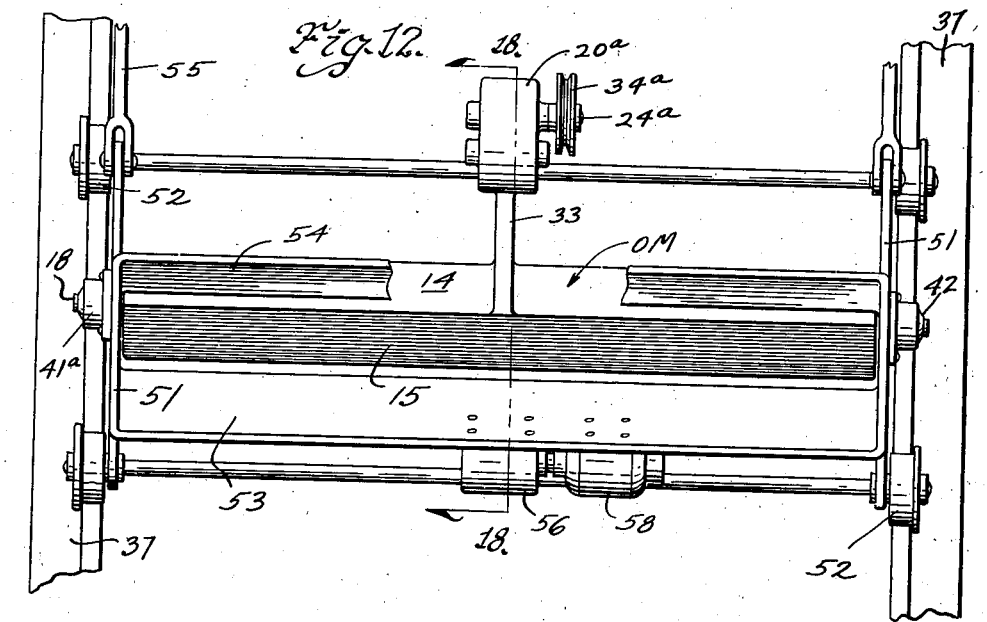
Inventor
Robert W. Baily
by Baird & Freeman
Attorneys Patented July 15, 1941

2,249,264

UNITED STATES PATENT OFFICE 2,249,264

OSCILLATOR

Robert William Baily, Narberth, Pa.

Application February 20, 1939, Serial No. 257,295

5 Claims. (Cl. 94—48)

My present invention relates to an apparatus for imparting vibrations to a mass of material, such as concrete, which becomes plastic when vibrated, the nature of the vibrations being alternating oscillations which when imparted to the mass cause it to become more homogeneous.

Another object is to provide a member which may be used in a liquid to expeditiously precipitate entrained materials therein or to hasten the chemical combinations of the materials closely associated in the fluid, the apparatus consisting essentially of a member having considerable length in proportion to its lateral dimensions and having a cross-sectional contour other than circular, means being provided to cause the member to oscillate about its longitudinal axis or revolve through less than a complete revolution first in one angular direction and then in the opposite angular direction through less than a complete circle, these revolutions or oscillations being repeated rapidly whereby projections extending transversely of the member engage the mass in which the member is at least partially immersed, such engagement being in alternately opposite directions whereby to vibrate the mass thus causing it, in the case of concrete or the like, to become plastic and flowing or in the case of liquids causing particles entrained therein to coalesce and become rapidly precipitated out of the fluid or to cause materials intimately associated in the fluid to combine chemically more rapidly than they would otherwise combine if not subjected to such vibrations or oscillations.

Another object of my invention is to provide a member that is other than round in cross section and which is oscillated on its longitudinal axis, the member making contact with a material to impart thereto rapid vibrations due to the oscillations of the member whereby the material will become flowing and plastic under the vibrating influence of the oscillating member, thus resulting in the elimination of entrapped air and surplus water from a material such as Portland cement concrete, the member if desired, being also arranged to strike off and smooth the surface of the mass as the oscillating member is propelled across the material.

Still another object is to provide means whereby the oscillations of the member are not transmitted to a supporting means therefor, and to provide means for oscillating the member in the form of rotating off center weights so designed and related to each other that oscillations as distinguished from the characteristic motion of an off center weight (circular motion) are imparted to the oscillating member which in turn effects vibration of the mass in which it is embedded or with which it is in contact.

A further object is to provide an apparatus for placing concrete or a like material in a slab such as a roadway by means of a container extending across the area of the slab, the forward wall of the container extending below the finished surface elevation of the slab and a vibrator being provided therefor to impart oscillations to the material in the container and to the material adjacent the lower edge of the forward wall thereof.

A further object is to provide the rearward wall of the container extending downwardly to a predetermined elevation above the finished surface of the slab, the aperture thus remaining being closed by an oscillating member having its lower surface substantially at the desired level of the finished surface of the slab and the oscillating member being effective to vibrate the material of the slab with which it is in contact and to strike off and reduce its upper surface to the desired finished level upon advancement of the apparatus across the slab.

Other objects, purposes and characteristic features of the present invention will be in part obvious from the accompanying drawings and in part pointed out as the description of the invention proceeds. In describing the invention in detail, reference will be made to the accompanying drawings, in which like reference characters designate corresponding parts throughout the several views and in which Figure 1 is a side elevation of a form of my apparatus particularly adapted for constructing roadways of concrete and the like;

Figure 2 is a plan view of the apparatus shown in Figure 1;

Figure 3 is a front elevation of the apparatus of Figure 2, parts being omitted and the forms being shown in section;

Figure 4 is an enlarged sectional view on the line 10—10 of Figure 2 showing the oscillating mechanism and its association with the oscillating member of the apparatus shown in Figures 1, 2 and 3;

Figure 5 is an enlarged sectional view on the line 11—11 of Figure 2 showing a supporting means for the oscillating member designed to minimize vibration imparted from the oscillating member to the supports therefor;

Figures 6, 7, 8 and 9 are diagrammatic views illustrating the operation of the oscillating member shown in Figures 1 to 4;

Figure 10 is a side elevation of another modified form of my apparatus;

Figure 11 is a plan view thereof, and

Figure 12 is a vertical sectional view on the line 18—18 of Figure 11.

Figure 1:
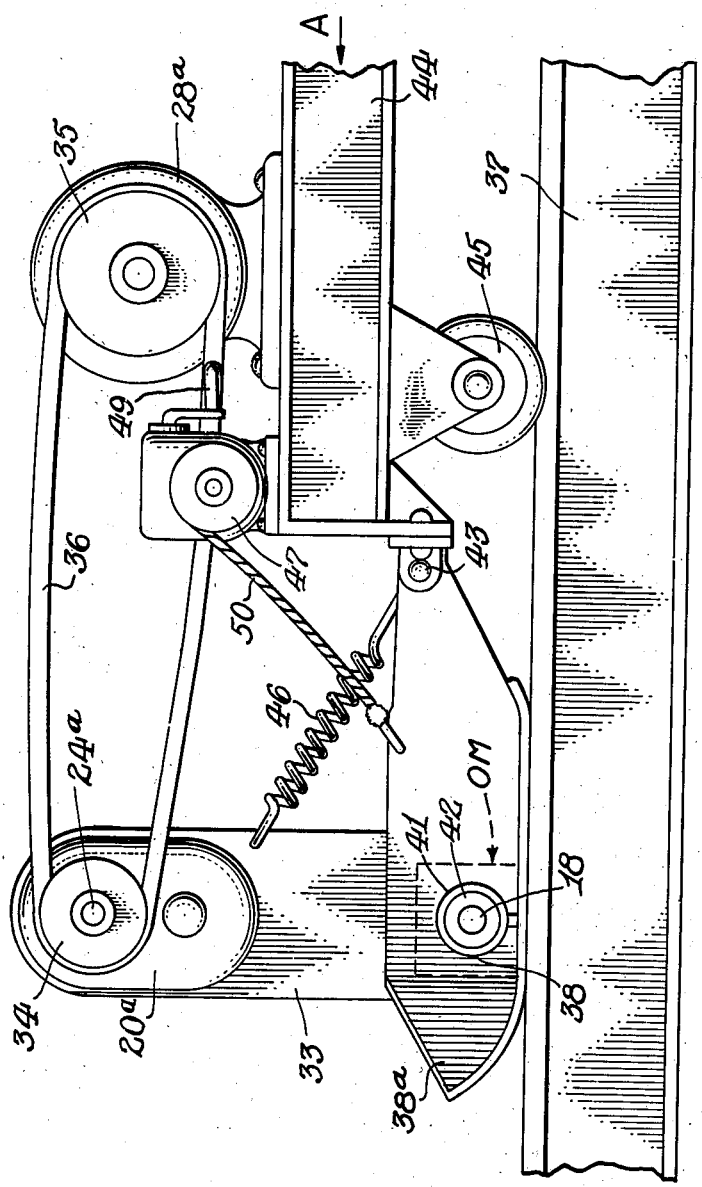

On the accompanying drawings I have used the reference character OM throughout the several views on the drawings to indicate an oscillating member. This member may take various forms, some of which will be specifically described by reference numerals. The oscillating member OM may consist of a tube having a bottom wall 13, a top wall 14, a front wall 15 and a rear wall 16. In Figures 6, 7, 8 and 9, the upper forward edge of the member OM appears at 14—F; the lower forward edge appears at 13—F, and the rearward lower edge appears at 13—R. In these figures the line 12—A represents the position of a line passing through the instantaneous axis of oscillation of the member OM and the center of origin of the forces generated by the rotating weights 25a and 25b when these weights impose the least forces in the direction from the center of origin in the direction of the center of oscillation of member OM. In Figure 7, the arrow F—13 indicates the direction of the forces generated by the revolving weights 25a and 25b when in the position shown. In Figure 9, the arrow F—15 indicates the direction of the forces generated by the revolving weights 25a and 25b when in the position shown. It will be noted, that for the arrangement of the weights 25a and 25b of Figs. 6, 7, 8 and 9, the forces F—13 and F—15 are the maximum unbalanced forces imposed by the weights, and that while these forces are not in directions perpendicular to the line 12—A, they still do not intersect the axis projected through the center of oscillation of the member OM. It is also to be observed from Figures 6 through 9 that as the member OM continues to move laterally with the face 15 advancing, the material 40 will continue to accumulate until it may flow over the face 14 of the member OM at which time the member OM will be totally immersed in the material 40. Although this tube has been shown as substantially square, it may assume different other-than-round shapes in cross section. It is preferably provided with end walls 17 from which extend pintles 18 for supporting it.

*Description of the structures shown in Figures 7 to 11*

The oscillating member OM has an arm 33 on which a casing 20a and its cover 22a are provided for oscillating mechanism, comprising a weight 25a mounted on shaft 24a which carries the gear 26a meshing with gear 26a on lower shaft 23a which carries weight 25b. Weights 25a and 25b are mounted synchronously, revolving in angularly opposite directions. By means of pulleys 34 and 35 and a belt 36 the shaft 24a is rotated from the motor 28a which may produce equal or different centrifugal magnitudes of centrifugal forces.

Side forms 37 are provided on which shoes 38 are adapted to rest and slide. The side forms 37 are adapted to be positioned on a road bed or sub-grade 39 and to receive concrete 40 to form a slab for the roadway, the side forms limiting the width thereof.

The pintles 18 of the oscillating member OM extend into hubs 41 of the shoes 38 and bushings 42 of rubber or other vibration-absorbing material fill the space in the hubs surrounding the pintles 18. Thus the oscillating member OM is mounted in such manner that transmission of vibration therefrom to the shoes 38 is minimized. Member OM may be operated at any level desired, with relation to forms 37.

The shoes 38 are pivoted as at 43 to a carriage 44. The carriage 44 has wheels 45 riding the side forms 37 and the carriage supports the motor 28a.

The vertical surfaces 38a of the shoes 38 serve to restrain any surplus of the material being treated from flowing over the side forms 37 and thereby being wasted.

The arm 33 extends upwardly from the oscillating member OM and may be retained in its approximately vertical position by suitable means such as a spring 46.

Winch drums 47 are mounted on a shaft 48, the rotation of which is controlled by a hand crank 49. Cables 50 extend from the drums 47 and connect with the shoes 38 for lifting them about their pivotal connections 43 when it is desired to transport the machine.

*Practical operation*

The carriage 44 is adapted to travel forwardly in the direction of the arrow A (see Figure 1). The shoes 38 have inclined wings 38' which deflect any concrete on the side forms 37 to a position between the side forms. As the drive shaft 24a is rotated, the weights 25a and 25b will assume successively the positions shown in Figures 6, 7, 8 and 9, with the weights rotating in the direction of the arrows as indicated. This results, as in Figure 6, in the material 40 of the slab piling in front of the oscillating member OM or flowing thereover and being vibrated by the rapid oscillations of the oscillating member, as in Figures 7, 8 and 9. In Figure 7 the oscillating member has tipped forwardly propelled by force F—13, while in Figure 9, it has tipped rearwardly propelled by force F—15. The cycles of these four figures are then repeated for each rotation of the shaft 24a. Such rotation at high frequency induces forces F—13 and F—15 and causes the oscillating movement to be imparted as a vibration of sufficient amplitude and of a sufficiently short period to cause the slab 40 when it consists of a comparatively dry, loose mass to become a comparatively wet, flowing mass, and to cause escape of any entrained air therefrom. The rapid impacts of the projecting parts 14—F, 13—F and 13—R of member OM of Figures 6, 7, 8 and 9 upon the material 40 due to the oscillation of member OM, compacts and densifies the material 40.

I have found the apparatus disclosed to be extremely efficient in the placement of Portland cement concrete in slabs and roadways. It is well known that vibrations applied to a stiff concrete mixture cause the mixture to become plastic and flowing.

In the present device the vibrations caused by the weights 25a and 25b produce an oscillating movement on the member OM about its longitudinal axis. Since the member is torsionally rigid, any torsional oscillations imparted to it will be efficiently transmitted at full amplitude to the extreme ends of the member and there will be no nodes or dead spots. As a result, the concrete material 40 will be efficiently vibrated throughout its full width between the side forms 37, due to the vibratory movements of the walls 13, 14, 15 and 16, and the projections 13—F, 13—R and 14—F.

Description of the apparatus shown in Figures 10 to 12

In this form of apparatus I provide side plates 51 having wheels 52 for the purpose of riding the side forms 37 instead of using the shoes 38 for this purpose. The side plates 47 together with a front wall 53 and a rear wall 54 form a container for loose concrete 40a to be deposited in the slab 40. The lower edge of the front wall 53 terminates slightly below the desired upper level of the slab 40, as shown in Figure 12, while the lower edge of the rear wall 54 terminates quite a distance above the slab. The oscillating member OM is of the same type shown in Figures 1 to 5, having its pintles 18 located in rubber bushings 42 carried by a hub plate 41a. The hub plates are attached to the side plates 51. The arm 33 of the oscillating member extends at an angle instead of vertically and similar oscillating mechanism and propelling mechanism therefor is provided. Therefore the oscillating mechanism and propelling mechanism are designated by the same reference numerals. Any suitable carriage, such as 44a, may be hitched to the side plates 51 as by links 55.

On the front wall 53 I mount a vibrator casing 56 having therein an off center weight 57. A suitable motor 58 is provided for driving the off center weight 57. Rotation of this weight vibrates the container wall 53 so that the concrete 40a therein becomes plastic and flowing and settles readily down to position on the subgrade 39. The oscillating member OM, as in the case of Figure 3, serves as a strike-off and finishing member for the surface of the slab 40.

Practical operation of the apparatus shown in Figures 10 to 12

As the vibrator 56—57 is operated, the material 40a will flow downwardly to position in the slab 40 by virtue of the vibrations imparted to the front wall 53 of the concrete container. The flowability of the material will be increased where it contacts with the oscillating member OM and there will also be some preliminary vibration imparted to the mass from this member before the material finally is deposited in the slab. As the apparatus is propelled forwardly and the hopper or container is kept filled with concrete 40a, it will be automatically deposited in the proper depth on the subgrade, whereupon its upper surface will be finished and the slab 40 vibrated by the oscillating member OM. Thus the slab is struck off and reduced to a finished surface simultaneously with the escape of entrapped air and surplus water, effected by vibrations imparted to the slab from the oscillating member. The hopper 51 and carriage supports 52 of Figures 10, 11 and 12 may be equipped with an elevating device similar to parts 47 and 50 of Figure 1. The lower edge of parts 53 of Figures 10, 11 and 12 may be adjusted to any desired elevation relative to side form 37, and the elevation of oscillating member OM may also be simultaneously or independently adjusted to any desired elevation relative to side forms 37.

Having described specific embodiments of my oscillator and the operation thereof, I desire it to be understood that these forms are selected to facilitate the disclosure of the invention rather than to limit the number of forms which it may assume, and it is to be understood further that various modifications, adaptations and alterations may be applied to the specific forms disclosed to meet the requirements of practice without in any manner departing from the spirit and scope of the present invention, except as set forth in the claims appended hereto.

I claim as my invention:

1. In an oscillator, an elongated horizontal oscillating member having longitudinally arranged ribs, a pair of eccentric weights, mounted out of the line of the long axis of said member on axes which lie in a single plane passing approximately through the said axis of said member and substantially parallel thereto, each eccentric weight rotating in opposite direction with respect to the other, said weights being so synchronized that the eccentrics are on the same side of the plane at the same time, thereby oscillating the member first in one angular direction and then in the opposite angular direction and about its own horizontal axis.

2. In an oscillator, an elongated oscillating member having longitudinally arranged ribs, a pair of eccentric weights mounted away from the member on axes which lie in a single plane passing substantially through the long axis of said member and substantially parallel thereto, each eccentric weight rotating in opposite direction with respect to the other, said weights being so synchronized that the eccentrics are on the same side of the plane at the same time, thereby oscillating the member about its own longitudinal axis.

3. In a device of the class described, an elongated oscillating member having longitudinally arranged ribs, actuating means for oscillating said member comprising a pair of eccentric weights, mounted away from the center of said long member on axes which lie in a single plane passing approximately through the axis of said member and substantially parallel thereto, each eccentric weight rotating in opposite direction with respect to the other, said weights being so synchronized that the eccentrics are on the same side of the plane at the same time, thereby oscillating the member about its own horizontal axis, means for supporting the oscillating member for transportation, and oscillation damping means interposed between the member and the supporting means.

4. In a device of the class described for treating a material, an elongated oscillating member, having longitudinally arranged ribs, actuating means for oscillating said member comprising a pair of eccentric weights, mounted away from the long axis of said member on axes which lie in a single plane passing approximately through the said axis of said member and substantially parallel thereto, each eccentric weight rotating in opposite direction with respect to the other, said weights being so synchronized that the eccentrics are on the same side of the plane at the same time, means for connecting the weights with the member for thereby oscillating the member about its own horizontal axis, supports for the oscillating member for traveling along forms determining the lateral limits of the material, and means on said supports for restraining material being treated from passing over the forms.

5. In a paving apparatus, a carriage adapted to travel along a roadway being paved, a container on the carriage having an orifice in its lower part for discharging paving material, an elongated oscillating member having longitudinally arranged ribs, arranged to engage material passing from the container and impart vibrations thereto, a pair of eccentric weights, mounted away from the longitudinal axis of said member on axes which lie in a single plane passing approximately through the longitudinal axis of said member and substantially parallel thereto, each eccentric weight rotating in opposite direction with respect to the other, said weights being so synchronized that the eccentrics are on the same side of the plane at the same time, thereby oscillating the member about its own longitudinal axis.

ROBERT WILLIAM BAILY.